Sept. 6, 1966 R. S. WATERS 3,271,052
COUPLING
Filed March 20, 1964

INVENTOR
Robert S. Waters
BY
Robert T. French
ATTORNEY

United States Patent Office 3,271,052
Patented Sept. 6, 1966

3,271,052
COUPLING
Robert S. Waters, Lexington, Ohio, assignor to Westinghouse Electric Corporation, Pittsburgh, Pa., a corporation of Pennsylvania
Filed Mar. 20, 1964, Ser. No. 353,507
5 Claims. (Cl. 285—7)

This invention relates to detachable hose couplings for suction cleaners and has particular reference to a new and improved coupling device of this type which is convenient to use and easy to manufacture.

In canister type suction cleaners, cleaning tools are attached to one end of a flexible hose while the other end is detachably connected to the cleaner housing. In order to conveniently connect and disconnect the hose to the cleaner it is most important that the coupling between the flexible hose and the cleaner housing be easy to couple and uncouple.

Heretofore, couplings of this type have been so constructed that the male element or section affixed to the flexible hose is rotated through a small angle to release the coupling. In such devices it is necessary to provide a swivel connection between the male element and the flexible hose, otherwise rotation of the hose will release the coupling. Even when a swivel connection is so provided it is still possible to accidentally release the coupling through rotation of the hose.

Also, in prior art devices of this type it is necessary to orientate the male element with respect to the female element so that proper engagement is effected.

Further disadvantages are found in the complexity of couplings and in the involved methods of attaching them to the cleaner housing.

Accordingly, it is the general object of this invention to provide a new and improved readily detachable coupling for suction cleaners.

It is a more particular object of this invention to provide a new and improved coupling for suction cleaners which permits relative rotation between the male and female elements of the coupling without a tendency to release the coupling.

Another object of this invention is to provide a new and improved coupling for suction cleaners which may be released by merely rotating the female element of the coupling through a small angle.

Still another object of this invention is to provide a new and improved coupling for suction cleaners in which the retaining element of the coupling is also used to secure the coupling to the cleaner housing.

A further object of this invention is to provide a new and improved coupling for suction cleaners which is simple in construction and inexpensively manufactured.

A still further object of this invention is to provide a new and improved coupling for suction cleaners in which the male element of the coupling can be quickly inserted and locked in position without having been orientated with respect to the female element.

Further objects and advantages of this invention will become apparent as the following description proceeds, and features of novelty which characterize the invention will be pointed out in particularity in the claims annexed to and forming a part of this specification.

For a better understanding of the invention reference may be had to the accompanying drawings, in which.

Figure 1:
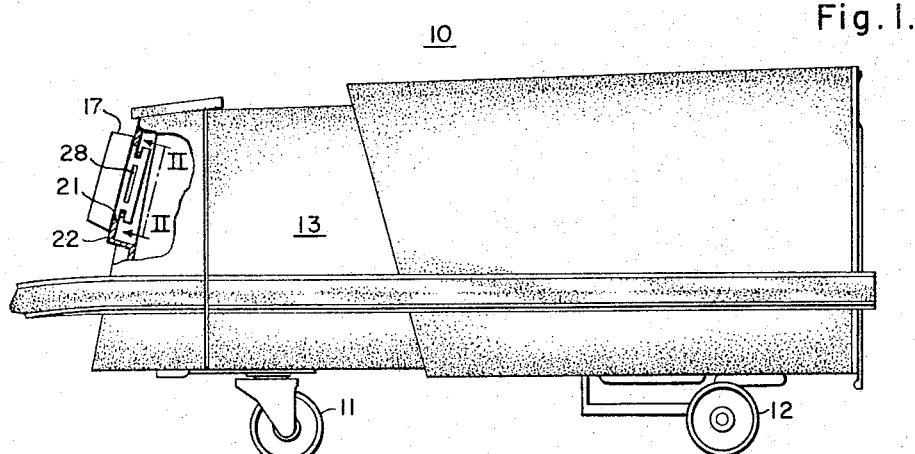
FIGURE 1 shows a canister suction cleaner, partially in section, incorporating one embodiment of the invention.

Referring to the drawings, especially FIG. 1, reference character 10 designates generally a suction cleaner carried by front wheels 11 and rear wheels 12, only one of each being shown. The suction cleaner comprises a housing 13 adapted to have a flexible hose 14 connected thereto by means of a detachable coupling, generally designated 15. As well understood in the art, dirt-laden air is drawn through the flexible hose and the suction cleaner by motor means (not shown), thereby providing suction at one end of the cleaner and pressure at the other end. The detachable coupling 15 and the hose 14 serve to connect the housing to a nozzle or the like (not shown) associated with the other end of the hose. As the dirt-laden air is drawn through the suction cleaner 10, it passes into a dirt filtering bag (not shown) and clean air is discharged through an outlet (not shown) in the rear portion of the cleaner housing 13.

Figure 4:
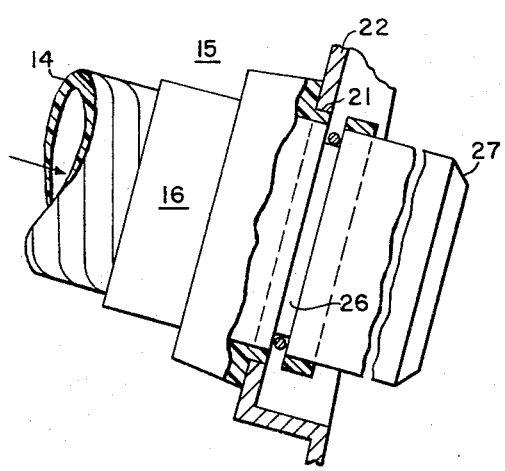
FIG. 4 is an enlarged fragmentary section of the cylindrical sleeve member shown in FIG. 1 but with the cylindrical terminal member inserted therein.

The detachable coupling 15, as best shown in FIG. 4, comprises a cylindrical terminal member 16 connected to the flexible hose 14, and a cylindrical sleeve member 17. The member 16 constitutes the male element of the coupling and the member 17 the female element thereof.

As shown more clearly in FIG. 5 the sleeve member 17, made from any suitable material, for example, plastic or the like, comprises a one piece element having a radial outwardly extending flange 18, the purpose of which will be discussed below. The sleeve member 17 is provided with a pair of diametrically opposed slots 19 having a plurality of cam surfaces 20 and is adapted to extend through and is rotatably supported in a cylindrical opening 21 (FIG. 4) provided in a wall 22 of the cleaner housing. The removal of the sleeve member 17 from the cylindrical opening 21 is prevented by a substantially U-shaped spring 23 having a pair of legs 24 (see FIGS. 2, 3 and 5) which are disposed in the slots 19. The free ends of the spring 23, as viewed in FIG. 2, extend beyond slots 19 and lie adjacent the wall 22 to the left of the opening 21 while the other end of the spring extends beyond slots 19 and lies adjacent the wall 22 to the right of the opening. The ends of the spring abut the inner surface of the wall 22 on both sides of the opening while the flange 18 abuts the outer surface of the wall, whereby the spring ends and the flange retain the cylindrical sleeve in the housing (see FIG. 5).

The end of the spring 23 to the right of the opening 21 (see FIGS. 2 and 5) is disposed in a slotted boss 25, formed integrally with the wall 2. This arrangement serves to restrain the right end of the spring, thereby enabling the legs 24 to be spread apart.

The terminal member 16, made from any suitable material, for example, plastic or the like, comprises a one piece cylindrical member having a circumferentially continuous groove 26 (FIG. 4) and a chamfered surface 27 adjacent its forward end. The chamfered surface, which is coextensive with the circumference of the terminal member, acts as a cam means for spreading the legs 24 radially outward an amount sufficient to permit insertion of the terminal member 16 into the sleeve member 17. As the terminal member is being inserted, the legs 24 move into the continuous groove 26 and abut the side walls of the groove thereby coupling the terminal member to the sleeve member (see FIG. 4). It will be apparent to those skilled in the art that it is not necessary to orientate the terminal member 16 before inserting it in the sleeve member 17.

The legs 24 can be removed from the groove 26 by rotating the sleeve member 17 through a small angle. When the sleeve member is in the rotated position, as viewed in FIG. 3, one pair of the cam surfaces 20 serve to deflect the legs outwardly thereby releasing the coupling between the terminal and sleeve members.

Figure 2:
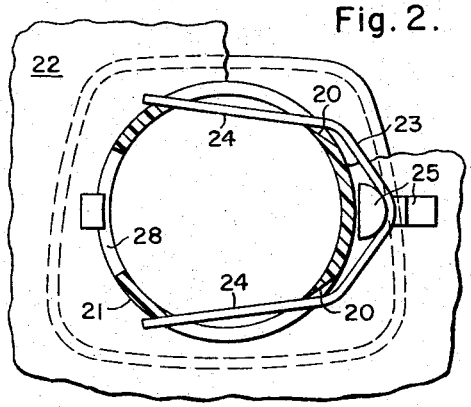
FIG. 2 is an enlarged view partly broken away of the female element in its locking position, taken on line II—II of FIG. 1.

The spring 23 is provided with sufficient restoring force that the legs 24, acting against cam surfaces 20, cause the sleeve member to be rotated back to its rest position, as viewed in FIG. 2.

Figure 5:
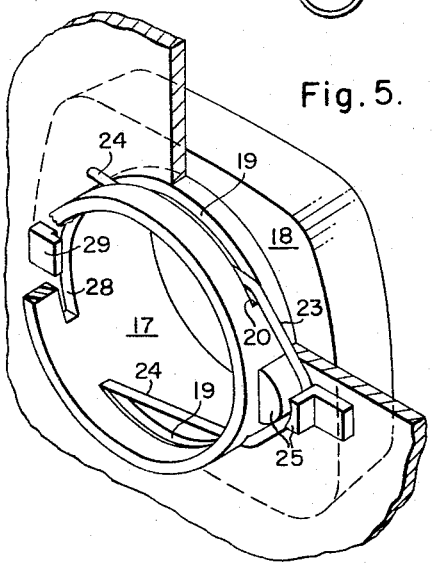
FIG. 5 is an enlarged perspective view, partially in section, of the cylindrical sleeve member and housing wall as viewed from inside the cleaner in the area of II—II in FIG. 1.
Figure 3:
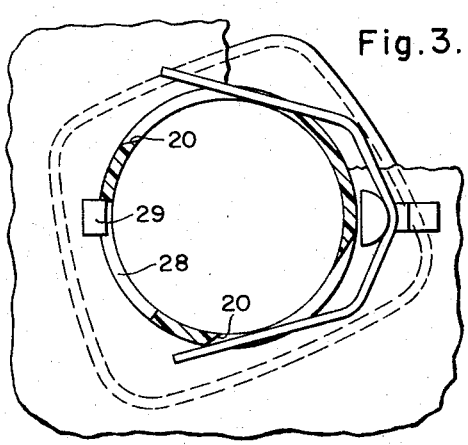
FIG. 3 shows the female element of FIG. 2 rotated to its unlocking position.

An elongated aperture 28 is provided in the sleeve member 17 (FIGS. 1 and 5). A boss 29 is disposed on the wall 22 adjacent the aperture 28 in such a manner that a portion thereof projects into the aperture. The projecting portion cooperates with either end of the aperture 28 to limit rotation of the sleeve member 17 (FIG. 3). This arrangement is effective to limit the spreading of the legs 24 so that they cannot be completely removed from the slots 19. As can be seen in FIG. 3, if the legs were spread beyond the position shown they would not function to prevent removal of the sleeve member from the opening 21.

Even though it is believed the operation of the apparatus will be apparent from the foregoing description, a brief review thereof will now be made for purposes of summary and simplification.

To connect the coupling, the terminal member 16 is inserted in the sleeve member 17 and moved axially to the right, as viewed in FIGS. 1 and 4, until the chamfered surface 27 engages the legs 24 and deflects them outwardly an amount sufficient to permit further insertion of the terminal member 16. As the terminal member is advanced to the right, the spring legs 24 snap into the groove 26 thereby coupling the terminal member to the sleeve member (FIG. 4).

The coupling action of the legs 24 is positive and there is no danger of the coupling being unlatched by strains imposed on the coupling, as by pulling force (to the left as viewed in FIG. 4) exerted on the hose 14 in normal operation of the suction cleaner. Such strains are transmitted in axial direction to the legs 24 from the hose 14 through the terminal member 16 and the right wall of the groove 26 and move the legs 24 into abutment with the inner surface of the wall 22.

The terminal member 16 is free to turn in response to a twisting force exerted on the hose 14, since the legs 24 ride smoothly in the continuous groove 26 without seizing or binding.

To release the coupling, the sleeve member is rotated by hand through a small angle causing the cam surfaces 20 to deflect the legs 24 outwardly an amount sufficient to permit the withdrawal of the terminal member (FIG. 3). After removal of the member 16, release of the member 17 will allow the latter to be returned to the position shown in FIG. 2 due to the restoring force of the spring acting upon the cam surfaces 20.

It will, therefore, be apparent that there has been disclosed a new and improved coupling which is easy to couple and uncouple, simple in construction and which utilizes a minimum number of parts.

While there has been shown and described what is at present considered to be the preferred embodiment of this invention, modifications thereto will readily occur to those skilled in the art. It is not desired therefore that the invention be limited to the specific arrangement shown and described and it is intended to cover in the appended claims all such modifications as fall within the true spirit and scope of this invention.

What is claimed is:

1. Mechanism for detachably connecting one end of a hose to a housing having an opening through a wall thereof, said mechanism comprising: a cylindrical sleeve member rotatably supported in said housing opening, said sleeve member being provided with means adapted to abut said housing wall at one side thereof, said sleeve member having at least one slot means disposed therein, spring means disposed in said slot means and extending beyond the periphery of said sleeve means, said slot means being of such a depth that at least a portion of said spring means extends into the interior of said sleeve member and the wall forming said slot means which is closest to said abutment means being removed axially therefrom a distance substantially equal to the thickness of said housing so that said portion of said spring means which extends beyond said sleeve periphery contacts said housing wall at the side thereof opposite the side thereof abutted by said abutment means whereby said abutment means and said spring means co-operate to retain said sleeve member in said housing opening, a cylindrical terminal member connected to said hose and receivable in said sleeve member, means carried by the outer surface of said terminal member for engaging said portion of said spring means extending into the interior of said cylindrical sleeve whereby said terminal member is retained in said sleeve member, co-operating means carried by said sleeve member and said housing adapted upon rotation of said sleeve member to temporarily effect disengagement of said portion of said spring means from said engaging means for permitting withdrawal of said terminal member from said sleeve member.

2. Structure as specified in claim 1, wherein said slot means comprises a pair of slots and said spring means comprises a substantially U-shaped member.

3. Structure as specified in claim 2, including means carried by said cylindrical terminal member adapted to temporarily move the portions of said substantially U-shaped member extending into the interior of said sleeve out of the interior of said sleeve upon insertion of said termnial member into said sleeve member.

4. Structure as specified in claim 3, wherein said substantially U-shaped member is disposed within said housing.

5. Structure as specified in claim 4, wherein said engaging means comprises a pair of circumferentially continuous walls defining a circumferentially continuous groove.

References Cited by the Examiner

UNITED STATES PATENTS

| 1,829,255 | 19/1931 | Ballou | 285—7 |
| 2,522,075 | 9/1950 | Van Der Heen | 285—7 |
| 2,665,148 | 1/1954 | Humphrey | 285—7 |
| 3,149,362 | 9/1964 | Smithson | 285—7 |

FOREIGN PATENTS

| 75,910 | 5/1953 | Denmark. |

CARL W. TOMLIN, *Primary Examiner.*

EDWARD C. ALLEN, *Examiner.*

R. GIANGIORGI, *Assistant Examiner.*